United States Patent
Kelly

(10) Patent No.: US 11,091,327 B2
(45) Date of Patent: Aug. 17, 2021

(54) SYSTEM AND METHOD USING TELEMETRY TO CONFIGURE CONTROL SYSTEMS FOR PNEUMATIC CONVEYING SYSTEMS

(71) Applicant: IPEG, Inc., Cranberry Township, PA (US)

(72) Inventor: Raymond Kelly, Cranberry Township, PA (US)

(73) Assignee: IPEG, Inc, Cranberry Township, PA (US)

( * ) Notice: Subject to any disclaimer, the term of this patent is extended or adjusted under 35 U.S.C. 154(b) by 0 days.

(21) Appl. No.: 16/368,283

(22) Filed: Mar. 28, 2019

(65) Prior Publication Data

US 2019/0322473 A1    Oct. 24, 2019

Related U.S. Application Data

(60) Provisional application No. 62/649,386, filed on Mar. 28, 2018.

(51) Int. Cl.
*B65G 53/24* (2006.01)
*B65G 53/50* (2006.01)
(Continued)

(52) U.S. Cl.
CPC ............. *B65G 53/50* (2013.01); *B65G 53/04* (2013.01); *B65G 53/66* (2013.01)

(58) Field of Classification Search
CPC ........ B65G 53/04; B65G 53/06; B65G 53/24; B65G 53/50; B65G 53/66
(Continued)

(56) References Cited

U.S. PATENT DOCUMENTS

| | | | | |
|---|---|---|---|---|
| 3,231,314 A | * | 1/1966 | Cook | A01K 61/80 |
| | | | | 406/74 |
| 3,802,782 A | * | 4/1974 | Natelson | G01N 21/253 |
| | | | | 356/409 |

(Continued)

*Primary Examiner* — Joseph A Dillon, Jr.
(74) *Attorney, Agent, or Firm* — Paul D Bangor, Jr.; Clark Hill PLC

(57) ABSTRACT

A material conveying system, comprising: a plurality of material sources for providing material to be transferred; a plurality of destination locations for receiving material from one or more of the plurality of material sources, wherein each destination location has a destination material inlet valve and a destination vacuum valve; a plurality of material conveying tubes; a plurality of vacuum pumps wherein each vacuum pump is operatively connected to one or more of the destination vacuum valves via one or more vacuum source tubes, and wherein each of the vacuum pumps is operatively connected to one or more of the material sources through the one or more vacuum source tubes and respective destination vacuum valves, the one or more destination locations and one or more of the plurality of material conveying tubes; a first sensor disposed on or near each destination vacuum valve; a second sensor disposed on or near each material inlet valve; a third sensor disposed on or near a vacuum outlet of each of the vacuum pumps; a programmable system controller connected, via wires or wirelessly, to each component of the material conveying system including the one or more material sources, the one or more destination locations, the vacuum pumps and to each of the first, second and third sensors; wherein the programmable controller is configured to determine which material sources and destination locations are operatively connected, directly and indirectly, to each of the plurality of vacuum pumps using one or more of the first, second and third sensors.

8 Claims, 2 Drawing Sheets

(51) Int. Cl.
    *B65G 53/66*     (2006.01)
    *B65G 53/04*     (2006.01)

(58) Field of Classification Search
    USPC ....... 406/2, 11, 12, 14, 19, 35, 36, 123, 153, 406/173, 181, 197; 366/163.2; 110/175; 137/625.11, 561 A
    See application file for complete search history.

(56) References Cited

U.S. PATENT DOCUMENTS

| | | | | |
|---|---|---|---|---|
| 3,901,555 | A * | 8/1975 | Wise | B65G 47/50 406/3 |
| 3,954,303 | A * | 5/1976 | Boring | B01F 15/0235 406/53 |
| 4,301,880 | A * | 11/1981 | Krambrock | G01G 13/26 177/189 |
| 4,415,297 | A * | 11/1983 | Boring | B65G 53/24 406/168 |
| 4,563,112 | A * | 1/1986 | Mokuya | B65G 53/30 137/110 |
| 4,740,112 | A * | 4/1988 | Muehlberger | B05B 7/1404 406/192 |
| 4,793,744 | A * | 12/1988 | Montag | A01C 15/04 111/34 |
| 4,834,004 | A * | 5/1989 | Butuk | A01C 15/04 111/200 |
| 4,938,848 | A * | 7/1990 | Raines | B65G 53/528 204/245 |
| 5,140,516 | A * | 8/1992 | Rainville | B65G 53/66 141/104 |
| 5,221,299 | A * | 6/1993 | Boring | B01D 45/12 55/459.1 |
| 5,622,457 | A * | 4/1997 | Thiele | B65G 53/56 406/1 |
| 6,659,284 | B2 * | 12/2003 | McCray | B03B 11/00 209/147 |
| 6,776,561 | B1 * | 8/2004 | Yeh | B01F 13/1005 141/105 |
| 6,782,835 | B2 * | 8/2004 | Lee | A01C 7/042 111/174 |
| 7,168,448 | B2 * | 1/2007 | Schmidt | F28B 1/06 137/561 A |
| 7,295,932 | B2 * | 11/2007 | Neundorfer | B65G 53/66 702/45 |
| 7,465,130 | B2 * | 12/2008 | Herre | B05B 7/1459 406/145 |
| 7,779,769 | B2 * | 8/2010 | Memory | A01C 7/081 111/174 |
| 8,360,691 | B2 * | 1/2013 | Moretto | B65G 53/66 406/17 |
| 8,753,432 | B2 * | 6/2014 | Maguire | B65G 53/40 95/280 |
| 8,936,416 | B2 * | 1/2015 | Stutz, Jr. | B24C 9/00 406/132 |
| 9,304,510 | B2 * | 4/2016 | Hoopes | G05B 19/041 |
| 9,440,802 | B2 * | 9/2016 | Moretto | B65G 53/24 |
| 9,561,915 | B2 * | 2/2017 | Kelly | B65G 53/24 |
| 9,937,651 | B2 * | 4/2018 | Zinski | B29C 48/288 |
| 10,131,506 | B2 * | 11/2018 | Maguire | B65G 23/44 |
| 10,138,076 | B2 * | 11/2018 | Maguire | B65G 53/66 |
| 10,144,598 | B2 * | 12/2018 | Zinski | B65G 53/26 |
| 10,175,701 | B2 * | 1/2019 | Maguire | F16K 17/34 |
| 10,179,696 | B2 * | 1/2019 | Maguire | G01F 11/40 |
| 10,179,708 | B2 * | 1/2019 | Maguire | B65G 53/66 |
| 10,280,015 | B2 * | 5/2019 | Maguire | F16K 17/34 |
| 10,414,083 | B2 * | 9/2019 | Zinski | B65G 53/66 |
| 10,759,612 | B2 * | 9/2020 | Bent | A01C 7/20 |
| 2002/0085886 | A1 * | 7/2002 | Dibble | B65G 53/66 406/197 |
| 2002/0114672 | A1 * | 8/2002 | Isozaki | C21B 5/026 406/11 |
| 2005/0178325 | A1 * | 8/2005 | Herre | B65G 53/28 118/308 |
| 2007/0022928 | A1 * | 2/2007 | Kowalchuk | A01C 7/082 111/175 |
| 2008/0022782 | A1 * | 1/2008 | Gysling | G01F 1/74 73/861.27 |
| 2009/0304461 | A1 * | 12/2009 | Strohschein | B65G 53/54 406/11 |
| 2012/0266966 | A1 * | 10/2012 | Kretschmer | C10J 3/723 137/1 |
| 2013/0211572 | A1 * | 8/2013 | Hoopes | B65G 53/66 700/112 |
| 2013/0299018 | A1 * | 11/2013 | Elliott | F16L 47/32 137/561 A |
| 2014/0130887 | A1 * | 5/2014 | Byrne | F04B 53/001 137/15.01 |
| 2014/0326339 | A1 * | 11/2014 | Toner | B01L 3/502746 137/561 A |
| 2014/0348597 | A1 * | 11/2014 | Moretto | B65G 53/66 406/31 |
| 2016/0096693 | A1 * | 4/2016 | Hanaoka | B65G 53/66 406/19 |
| 2016/0272438 | A1 * | 9/2016 | Brewster | B65G 53/66 |
| 2016/0272439 | A1 * | 9/2016 | Kelly | B65G 53/528 |
| 2019/0263602 | A1 * | 8/2019 | Berg | B65G 51/18 |
| 2019/0322472 | A1 * | 10/2019 | Kelly | B65G 53/06 |

\* cited by examiner

SYSTEM AND METHOD USING TELEMETRY TO CONFIGURE CONTROL SYSTEMS FOR PNEUMATIC CONVEYING SYSTEMS

CROSS REFERENCE TO RELATED APPLICATIONS

The present application claims the benefit of provisional patent application U.S. patent application Ser. No. 62/649,386 entitled "USING TELEMETRY TO CONFIGURE CONTROL SYSTEMS FOR PNEUMATIC CONVEYING SYSTEMS" and filed Mar. 28, 2018, the entirety of which is incorporated herein by reference for all purposes.

TECHNICAL FIELD OF THE INVENTION

The present disclosure generally relates to the field of pneumatic material conveying systems and methods.

BACKGROUND OF THE DISCLOSURE

Traditionally, pneumatic conveying systems are "hard-wired" systems. That is they have control wires running between the vacuum pump controller and the material receiver controller. When this is the case, it is necessary that the wires be connected between the vacuum pump and the material receiver controllers in a particular manner. The way the wires are connected determines which vacuum pump is connected to which material receiver. With wireless control topologies, this "hard-wired" relationship is no longer necessary nor present. Therefore determining which vacuum pump is connected to which material receiver is no longer a simple matter of verifying or tracing wire connections.

According to the present disclosure, sensors, such as vacuum, pressure, acoustic, or vibration sensors typically located in the conveying lines for other purposes as described herein, are used to determine which material receiver is connected to which vacuum pump and which material source is connected to that material receiver. When a new system is first started, each vacuum pump is turned on one at a time. All material receivers connected to that vacuum pump are identified by the sensor on the vacuum line of the material receiver sensing vacuum. In this manner, the vacuum pump-material receiver connection is verified. By closing the material line valve at each material source and opening the vacuum line valve located in each material receiver one at a time, the material source connected to each material receiver will be identified by the sensor located in the material line valve sensing vacuum. In this manner, the system control device can determine which vacuum pump controls which material receivers and which material receivers are connected to which material sources.

Additionally, in factories that use pneumatic conveying methods to move material, it is common to have a fantail manifold, sometimes called a selector station, where material sources are connected to material destinations. This selector station is used to select which material is going to be conveyed to what destination. The selector station provides flexibility to permit various destinations to be connected to different sources depending on the material desired at the time. The flexibility of being able to connect various sources to various destinations also allows the undesired effect of connecting the wrong source material to a destination.

Also, pneumatic conveying systems employing wireless controllers on the various components, such as the source material containers, vacuum pumps, material receivers and valves, allows the undesired effect of connecting the wrong source material to a destination or not knowing which source material is connected to a destination component.

In prior pneumatic conveying systems, the wrong material is prevented from being connected by radio frequency identification tags, mating connectors, machine vision, and manual inspection. Manual inspection is subject to the same human error that caused the initial problem and the other methods have deficiencies as well. Radio frequency identification tagging techniques are relatively expensive and involve calibration or paring of the mating connections. Mating connectors are reliant on discrete wiring that is subject to breakage. Machine vision proofing is relatively expensive and involves a camera system that is not effective in high ambient lighting conditions.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a material conveying system, comprising: a plurality of material sources for providing material to be transferred; a plurality of destination locations for receiving material from one or more of the plurality of material sources, wherein each destination location has a destination material inlet valve and a destination vacuum valve; a plurality of material conveying tubes; a plurality of vacuum pumps wherein each vacuum pump is operatively connected to one or more of the destination vacuum valves via one or more vacuum source tubes, and wherein each of the vacuum pumps is operatively connected to one or more of the material sources through the one or more vacuum source tubes and respective destination vacuum valves, the one or more destination locations and one or more of the plurality of material conveying tubes; a first sensor disposed on or near each destination vacuum valve; a second sensor disposed on or near each material inlet valve; a third sensor disposed on or near a vacuum outlet of each of the vacuum pumps; a programmable system controller connected, via wires or wirelessly, to each component of the material conveying system including the one or more material sources, the one or more destination locations, the vacuum pumps and to each of the first, second and third sensors; wherein the programmable controller is configured to determine which material sources and destination locations are operatively connected, directly and indirectly, to each of the plurality of vacuum pumps using one or more of the first, second and third sensors.

Another aspect of a preferred embodiment of the present disclosure comprises a method of mapping a configuration of a pneumatic material conveying system, comprising; (a) turning on a first vacuum pump of the pneumatic material conveying system; (b) opening a vacuum valve on each respective material receiver of the system wherein a first sensor is disposed on or near each such vacuum valve; and (c) comparing readings from each of the first sensors to readings from a second sensor disposed on or near the first vacuum pump or determining which first sensors provide a reading to determine which material receivers are connected to the first vacuum pump.

Another aspect of a preferred method of mapping a configuration of a pneumatic material conveying system of the present disclosure further comprises: repeating each of (a), (b) and (c) for each vacuum pump of the system.

Another aspect of a preferred embodiment of the present disclosure comprises a method of mapping a configuration of a pneumatic material conveying system, comprising; (a) closing a material line valve at each material source of the pneumatic material conveying system, wherein a first sensor is disposed on or near each such source material line valve; (b) turning on each vacuum pump of the pneumatic material conveying system, wherein a second sensor is disposed on or near each such vacuum pump; (c) opening, for each material receiver of the system one at a time, each vacuum valve and/or each material valve on each respective material receiver of the system; and (d) comparing readings from each of the first sensors to readings from each of the second sensors or determining which first sensors provide a reading to determine which material receivers are connected to each material source of the system.

Another aspect of a preferred method of mapping a configuration of a pneumatic material conveying system of the present disclosure further comprises: repeating each of (a), (b), (c) and (d) for each material source of the system.

Yet another aspect of a preferred method of mapping a configuration of a pneumatic material conveying system of the present disclosure further comprises: taking readings from third sensors on or near each vacuum valve and/or each material valve on each respective material receiver of the system; and comparing readings from each of the third sensors for each respective material receiver to readings from each of the first and second sensors for the material source and vacuum pump, respectively, connected to each such material receiver to check on whether such line combination is working properly.

In another aspect of a preferred method of mapping a configuration of a pneumatic material conveying system of the present disclosure, each of the first, second and third sensors is selected from the group consisting of a vacuum sensor, a pressure sensor, a vibration sensor and an acoustic sensor.

In a further aspect of a preferred method of mapping a configuration of a pneumatic material conveying system of the present disclosure, each of the first, second and third sensors is a vacuum sensor.

In another aspect of a preferred method of mapping a configuration of a pneumatic material conveying system of the present disclosure, each of the first, second and third sensors is a pressure sensor.

In a further aspect of a preferred method of mapping a configuration of a pneumatic material conveying system of the present disclosure, each of the first, second and third sensors is a vibration sensor.

In another aspect of a preferred method of mapping a configuration of a pneumatic material conveying system of the present disclosure, each of the first, second and third sensors is an acoustic sensor.

Preferably, the system of the present disclosure minimizes downtime by observing and identifying problems before they adversely affect pneumatic material conveying systems and also aids in quickly identifying problems or abnormalities after they have appeared in pneumatic conveying systems.

Many other variations are possible with the present disclosure, and those and other teachings, variations, and advantages of the present disclosure will become apparent from the description and figures of the disclosure.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION OF PREFERRED EMBODIMENT(S) OF THE DISCLOSURE

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following description is, therefore, not to be taken in a limited sense, and the scope of the inventive subject matter is defined by the appended claims and their equivalents.

Figure 1:
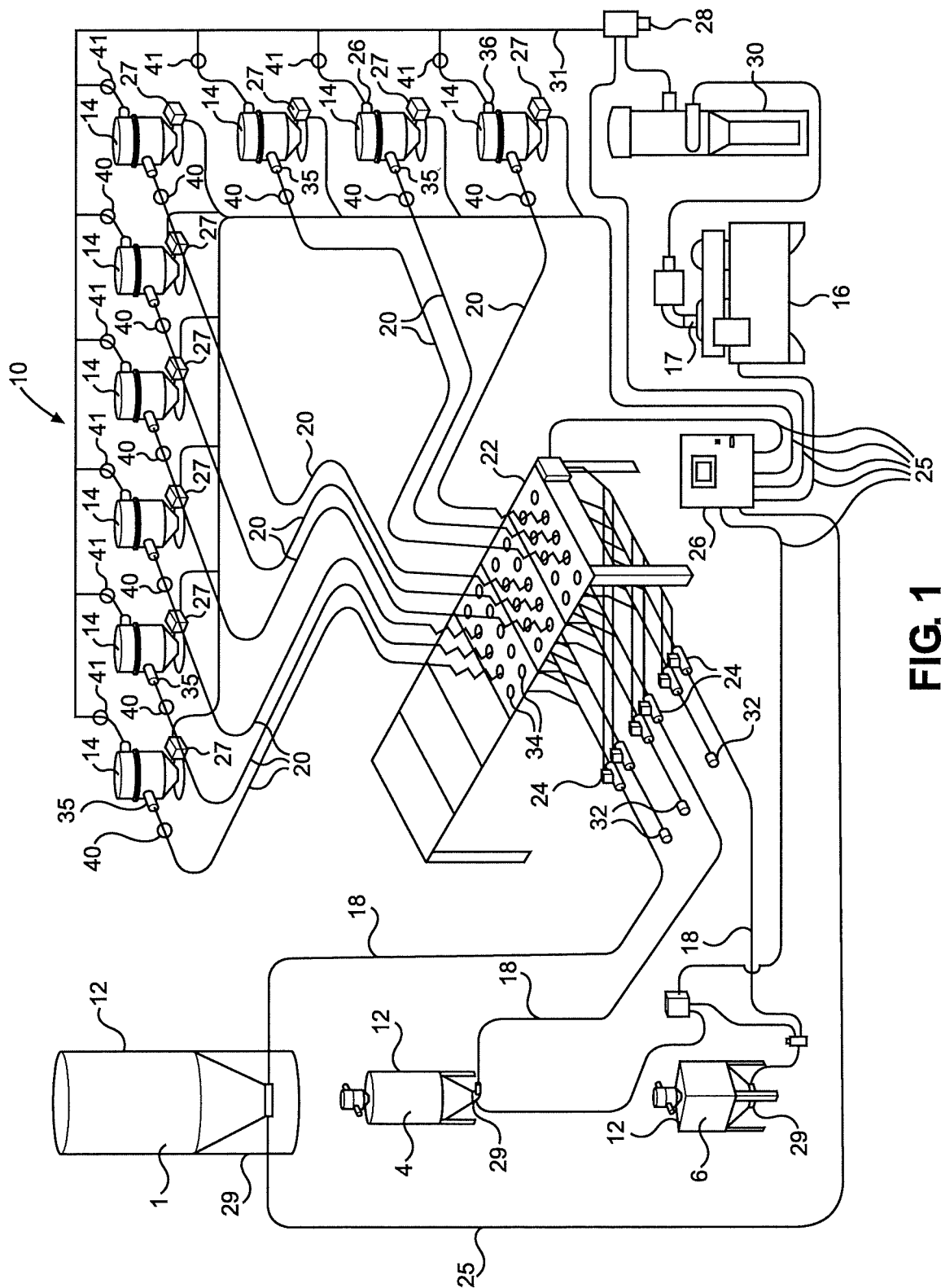
FIG. 1 is a schematic showing various components of a preferred embodiment of a pneumatic conveying system of the present disclosure.
Figure 2:
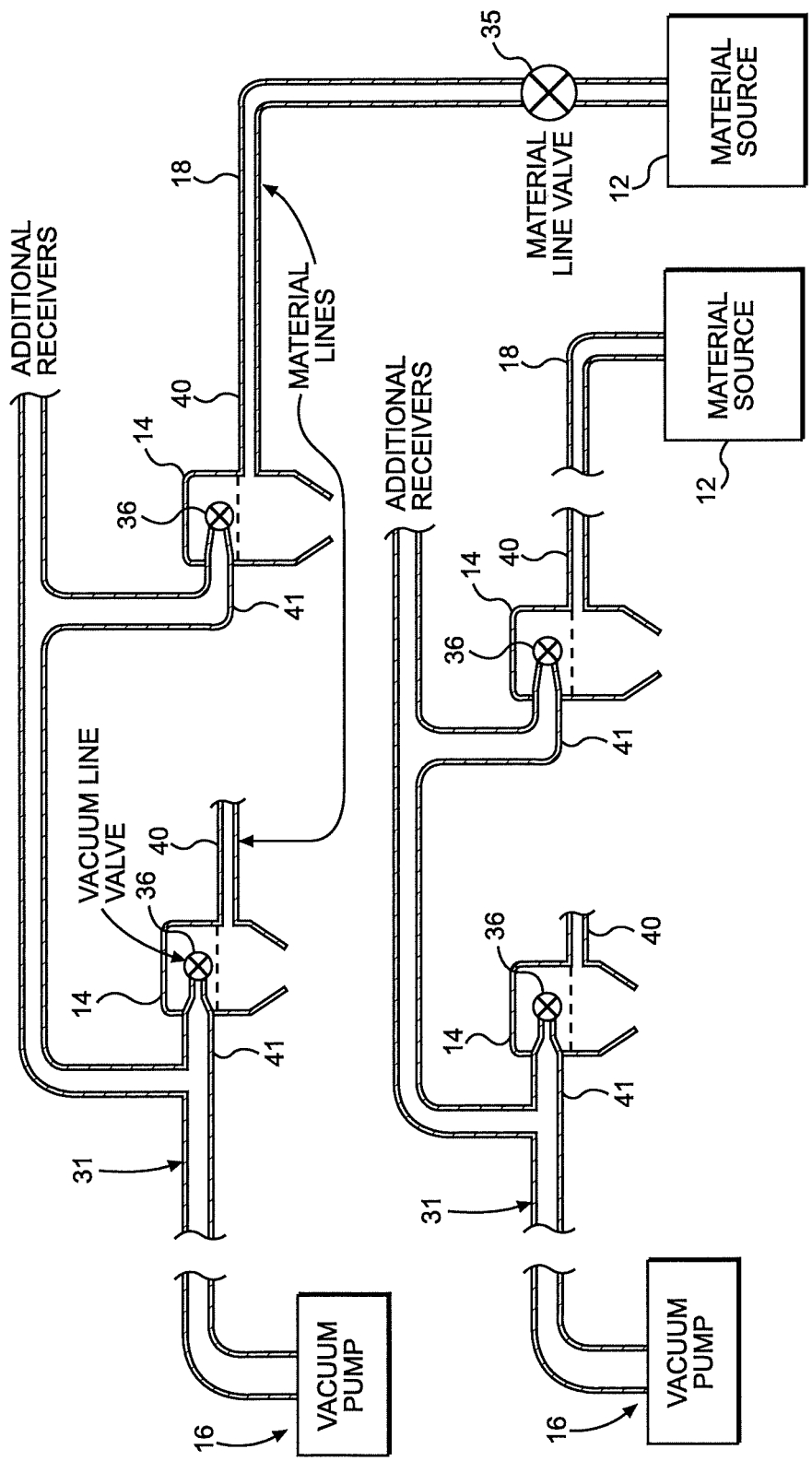
FIG. 2 is a schematic showing various components of another preferred embodiment of a pneumatic conveying system of the present disclosure.

Referring to FIGS. 1-2, one embodiment of the present disclosure system comprises a pneumatic conveying system 10. In system 10, bulk material is transferred from source locations 12 to destination locations 14 through the use of one or more vacuum sources or pumps 16. The bulk material may be in the form of powders, granules, and dry bulk material such as ash, beans, cement, corn cobs, corn, corn flakes, plastics, sand, and wheat. The source locations 12 may be one or more drums, bins, silos, or other vessels that hold or delivers source material. The destination locations 14 may be one or more hoppers or loaders intended to receive source material. The material travels from a selected source location 12 to a selected destination location 14 through conveying tubes 18, 20. Source conveying tubes 18 connect source locations 12 to a distribution mechanism or fantail manifold 22. Destination conveying tubes 20 connect fantail manifold 22 to destination locations 14. Fantail manifold 22 has multiple openings with each of the openings 34 connected to a selected one of the destination locations 14 and with each opening 34 configured to be selectively connected to one of the material sources 12 for selectively directing material from the selected material source 12 to the selected destination location 14.

According to the present disclosure, sensors 17, 24, 29, 40 and 41 may comprise vacuum sensors, pressure sensors, vibration sensors and/or acoustic sensors typically located in the conveying lines 18, 20 and vacuum lines 31 for other purposes as described herein, are used to determine which material receiver 14 is connected to which vacuum pump 16 and which material source 12 is connected to each such material receiver 14. When a new system 10 is first started, each vacuum pump 16 is turned on one at a time. All material receivers 14 connected to that vacuum pump 16 are identified by the respective sensors on the vacuum line 31 of the material receiver 14 sensing vacuum from a vacuum pump 16. In this manner, the vacuum pump 16-material receiver 14 connection is verified. By closing the material line valve 50 at each material source 12 and opening the vacuum line valve 36 located in each material receiver 14 one at a time, the material source 12 connected to each material receiver 14 will be identified by the sensor 24 and/or 40 located in the material line valve 35 and/or 50 sensing vacuum. In this manner, the system control device 26 (wired or wireless) can determine which vacuum pump 16 controls which material receivers 14 and which material receivers 14 are connected to which material sources 12.

In another preferred embodiment, system 10 described herein monitors the vacuum or pressure level in all source conveying tubes 18 and through a logic processor 26 (which may use connecting wires 25 or comprise wireless communication capabilities for communicating with system components) determines whether the correct source conveying tube 18 is connected to the correct destination conveying tube 20 by insuring that when the vacuum or pressure is applied through the selected destination location 14, the proper source location 12 also incurs a difference in vacuum or pressure from the ambient. This is accomplished by mounting a sensor 24 in the form of a vacuum sensor or pressure switch on each source conveying tube 18. No additional wiring, components, or modifications are necessary to the destination side of the fantail manifold 22. When the logic processor 26 provides vacuum to a destination valve 36 operatively connected to destination location 14, the vacuum pump 16 is connected to a source 12 through the fantail manifold 22. When the destination location 14 is a loader, the destination valve 36 is preferably located in the loader lid. The vacuum is sensed by the vacuum sensors 24 mounted on the source conveying tubes 18. The vacuum sensors 24 are connected to the logic processor 26 that compares which destination location 14 has the vacuum or pressure applied and which source 12 incurs similar vacuum or pressure. If the correct source 12 has the vacuum or pressure change relative to ambient, the system 10 is permitted to continue to operate. If an incorrect source 12 incurs the vacuum or pressure differential, the logic processor 26 stops the vacuum pump 16 to prevent the system 10 from conveying material, and notifies operators through sound, light, electronic message, or other alarm or error notification means.

Logic processor 26 is typically the control portion of a complete central loading system including several vacuum pumps 16 with their associated destination locations or material receivers 14 and many source locations 12. The logic processor 26 coordinates the sharing of source locations 12 with the destination locations 14 in the system. Vacuum pumps 16 are busy when they are servicing other destination locations 14 and source locations 12 are busy when they are being used by other destination locations 14. Destination locations 14 and source locations 12 are enabled in the software of the logic controller 26 which makes them ready to run. Destination locations 14 have demand when their demand sensor is uncovered. Vacuum pumps 16 are not busy when they are idling or not servicing other destination locations 14.

Referring to FIG. 1, system 10 further comprises a relief valve 28 associated with the vacuum pump 16. The relief valve 28 is used to relieve a portion of the vacuum from the source conveying tube 18 until the vacuum sensor 24 determines if the correct connection is made. Only one source conveying tube 18 is connected to the vacuum pump 16 at a time, and that is determined by which destination location 14 has the destination valve 36 open. By partially relieving the vacuum until the connection is proofed, it is possible to prevent the conveyed material from beginning to move and possibly going into the wrong conveying tube 20.

Referring to FIG. 1, system 10 further comprises a dust collector 30. The dust collector 30 separates any dust that is carried through the destination locations 14 from the air before the air goes into the vacuum pump 16. Dust entering the vacuum pump 16 causes maintenance problems and shortens the life of the vacuum pump 16. The spare lines 32 in FIG. 1 represent future expansion. The spare lines 32 could be connected to additional source locations 12 added to the factory in the future. The three source locations 12 are examples of the storage vessels that could be used: source location 12 designated by #1 is a silo typically located outside a building, source location 12 designated by #4 is a drying hopper having a dryer (not shown) connected to it, source location 12 designated by #6 is a surge bin, or an intermediate storage area inside the building, that could be filled from a silo or from boxes of material. Other storage vessels can also be used.

Embodiments of the present disclosure prevent the wrong material from being conveyed to the wrong destination by the addition of vacuum sensors 24 to the source conveying tubes 18 used for conveying material. No additional components are required on the destination side of the fantail manifold 22. The system is less expensive and can be easily retrofit to existing fantail manifolds.

Other preferred embodiments of conveying system 10 of the present disclosure may differ with variations in the number of receivers 14, size of vacuum pumps 16, size (or diameter) and length of vacuum lines 31, size (or diameter) and length of material lines 18, 20, size of dust collector 30, material(s) being conveyed, vertical and horizontal distances of material and line sizes, and number of bends in material lines 18, 20 and vacuum lines 31. During operation of conveying system 10 many problems can occur that negatively affect the performance of conveying system 10. Examples are leaks in the vacuum lines 31, leaks in the material lines 18, 20, leaks in valves 36 in the receiver and material lines 18, 20, filter cleanliness, pump seals, leaks in dust collector seals, and obstructions in material lines 18, 20 and vacuum lines 31. Because of the variety of potential problems, the expansiveness of the pneumatic conveying system 10, and the difficulty accessing the system components which are normally installed above all other equipment in the factory, troubleshooting may be very tedious.

Preferably, as shown in FIG. 1, the pneumatic conveying system 10 of the present disclosure uses sensors 17, 24, 29, 40 and 41 of the wired or wireless variety in proximity to the vacuum inlet or valve 36 of material receivers 14, the material inlet 35 of the material receivers, and vacuum outlet of one or more vacuum pumps 16, and/or at the material source 12 which can be used to characterize a properly performing pneumatic conveying system 10 and diagnose problems with an improperly performing pneumatic conveying system 10. Preferably, sensors 17, 24, 29, 40 and 41 may comprise a vacuum sensor, a pressure sensor, a vibration sensor or an acoustic sensor.

When a new pneumatic conveying system 10 is started and before material is conveyed, vacuum pump 16 can be turned on and measurements made at vacuum line sensors 41 should be similar to each other. A difference in sensor readings is an indicator that a vacuum leak is present. This vacuum leak could be measured as a difference in vacuum level among the sensors 41. Vacuum readings closer to ambient pressure indicate a leak close by a sensor 41, while vacuum readings closer to that measured at the vacuum pump 16 indicate a properly sealed system 10. If a new pneumatic conveying system 10 has no leaks, all vacuum sensors 41 located on the vacuum lines 31 will have readings similar to sensor 17 on the vacuum pump 16. If any vacuum sensor 40 differs significantly from the vacuum pump sensor 17, the system 10 is preferably analyzed for leaks which should be corrected before continuing.

Once the vacuum line side is confirmed to be operating correctly, the material lines 18 and 20 can be tested. Each material line 18, 20 can be blocked at the source 12 and once again the pump 16 is turned on. When the vacuum line valve 36 in the material receiver 14 corresponding to that material line 18, 20 is opened, the vacuum sensor(s) 24, 40 on that material line 18, 20 should read values similar to that of sensor 41 on the vacuum line 31 and sensor 17 on vacuum pump 16. If any vacuum sensor(s) 24, 40 on the material lines 18, 20 differ significantly from the vacuum line sensors 41, the system 10 will be analyzed for leaks to be corrected before continuing.

Once all material lines 18, 20 have been tested and verified to have vacuum readings similar to the vacuum lines 31 and vacuum pump 17, the system 10 is ready to record baseline readings that can be used for future troubleshooting. A first set of readings is preferably taken with all vacuum line valves 36 closed. Then a set of readings is preferably recorded when each vacuum line valve 36 is open, both with the material line 18, 20 open and with the material line 18, 20 closed. These readings are preferably stored for comparison in the future for preventive maintenance and troubleshooting of pneumatic conveying system 10.

Similarly, vibration and acoustic measurements can be made to observe anomalies and identify which branch of vacuum and/or material lines and the approximate position(s) of problems.

In a preferred aspect, the present disclosure uses sensors located in pneumatic conveying lines to determine which material receiver is connected to which vacuum pump and additionally which material receiver is connected to which material source. By locating vacuum, pressure, acoustic, or vibration sensors in the pneumatic conveying lines, each material receiver can be uniquely identified as to the vacuum pump supplying vacuum and the material source to which it is connected. This is of particular importance for pneumatic conveying systems that are using wireless communications between the vacuum pump controller and the material receiver controller.

In another preferred aspect, the present disclosure uses sensors located in pneumatic conveying lines to determine normal operating characteristics and aid in troubleshooting. Each pneumatic conveying system is unique and therefore has its own distinctive operating parameters. By locating vacuum, acoustic, and/or vibration sensors in the pneumatic conveying lines these distinctive operating parameters can be monitored and recorded such that: 1. A baseline can be established for a pneumatic conveying system before material is introduced into the system; 2. A baseline can be established for a pneumatic conveying system while material is being conveyed; 3. The baselines can be analyzed to determine if there are abnormalities and determine if these baselines are suitable for comparing future measurements; 4. The characteristics can be monitored without conveying material and compared to the baseline to determine abnormalities before the conveying system performance is adversely affected; 5. The characteristics can be monitored while conveying material and compared to the baseline to determine abnormalities before the conveying system performance is adversely effected; 6. The characteristics can be monitored without conveying material and compared to the baseline to determine causes of problems after they adversely affect conveying performance; 7. The characteristics can be monitored while conveying material and compared to the baseline to determine causes of problems after they adversely affect conveying performance; 8. The characteristics can be monitored without conveying material and analyzed to determine causes of abnormalities before or after the conveying system performance is adversely effected; and/or 9. The characteristics can be monitored while conveying material and analyzed to determine causes of abnormalities before or after the conveying system performance is adversely affected.

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method of mapping a configuration of a pneumatic material conveying system having a first vacuum pump and a second sensor disposed on or near the first vacuum pump, a plurality of material receivers, wherein each material receiver includes a vacuum valve and a first sensor disposed on or near each such vacuum valve, comprising;
    (a) turning on the first vacuum pump of the pneumatic material conveying system;
    (b) opening the vacuum valve on each of the plurality of material receivers of the system; and
    (c) comparing readings from each of the first sensors to readings from the second sensor disposed on or near the first vacuum pump for determining or mapping which of the first sensors provide a reading to determine which material receivers are connected to the first vacuum pump.

2. The method of claim 1 further comprising:
    repeating each of (a), (b) and (c) for each vacuum pump of the system.

3. The method of claim 1, wherein each of the first and second sensors is selected from the group consisting of a vibration sensor and an acoustic sensor.

4. The method of claim 2, wherein each of the first and second sensors is selected from the group consisting of a vibration sensor and an acoustic sensor.

5. The method of claim 1, wherein each of the first and second sensors is a vibration sensor.

6. The method of claim 2, wherein each of the first and second sensors is a vibration sensor.

7. The method of claim 1, wherein each of the first and second sensors is an acoustic sensor.

8. The method of claim 2, wherein each of the first and second sensors is an acoustic sensor.

* * * * *